Nov. 1, 1927. 1,647,384
T. L. VALERIUS ET AL
ICE CREAM CUTTING MACHINE
Filed Aug. 11, 1921  5 Sheets-Sheet 1
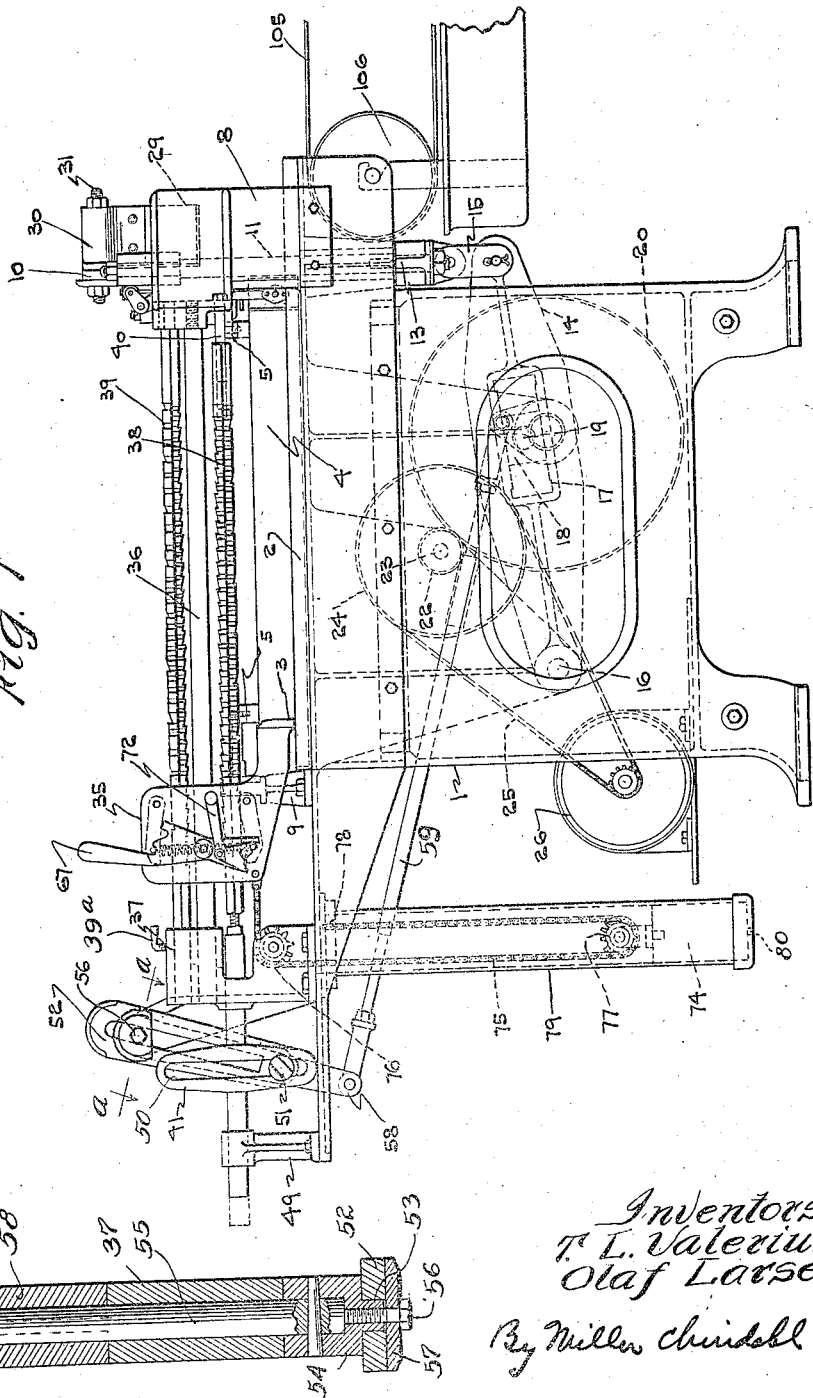
Inventors:
T. L. Valerius
Olaf Larsen
By Miller Chindahl Parker
Attys

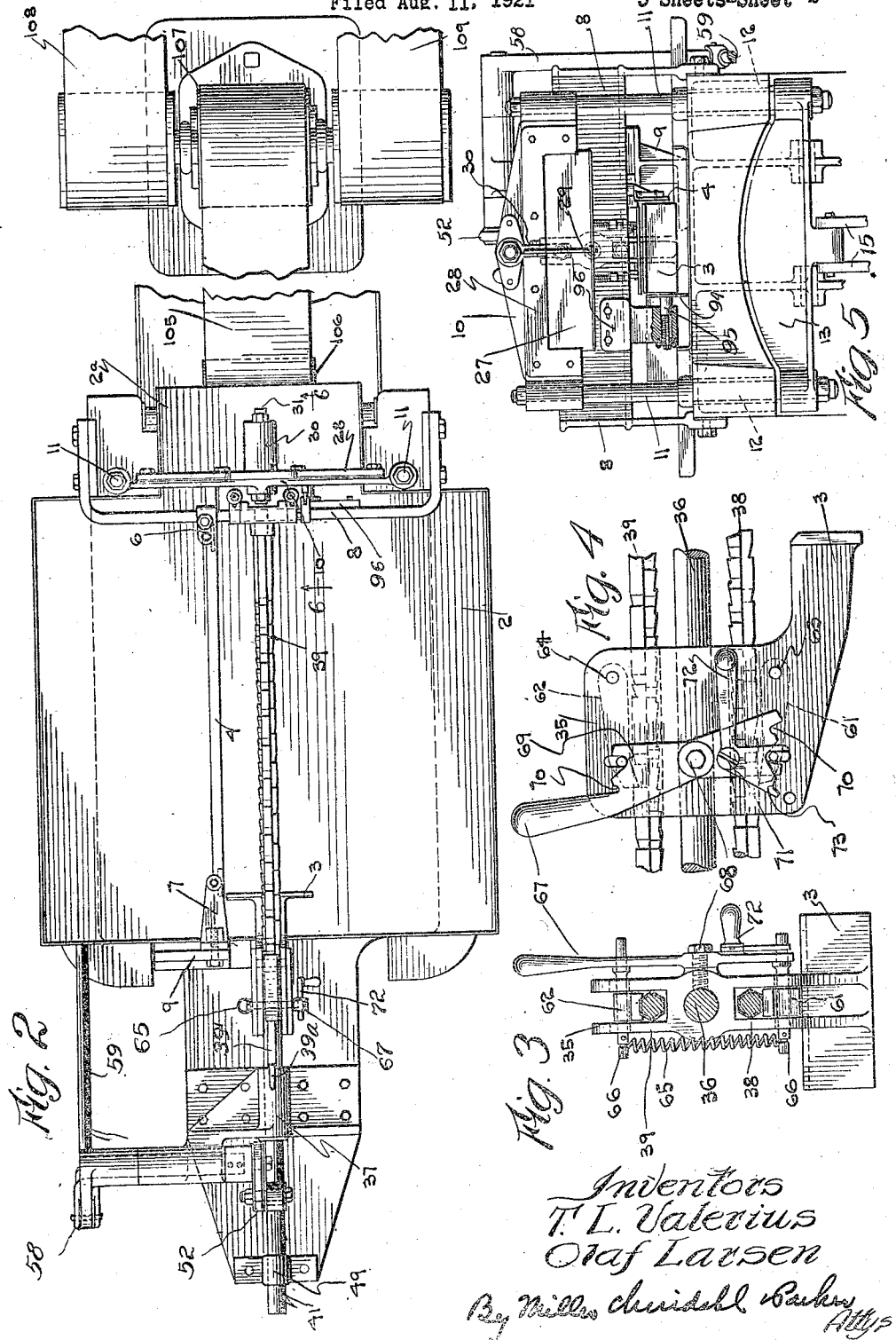

Nov. 1, 1927.  1,647,384
T. L. VALERIUS ET AL
ICE CREAM CUTTING MACHINE
Filed Aug. 11, 1921    5 Sheets-Sheet 3
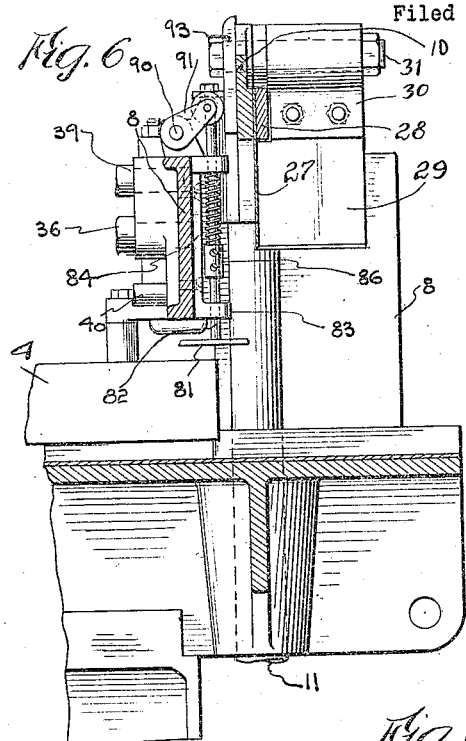
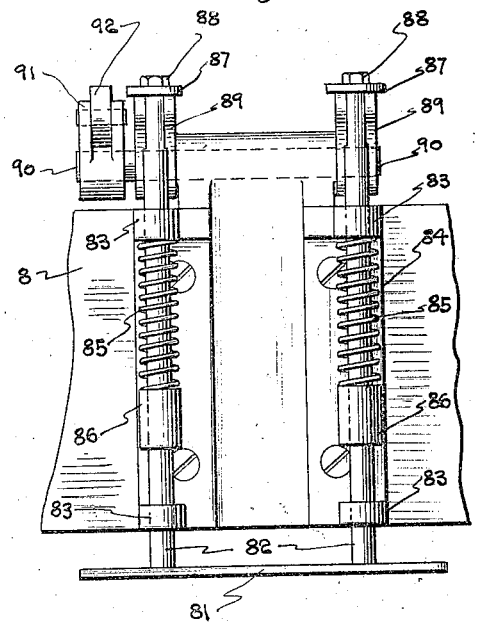
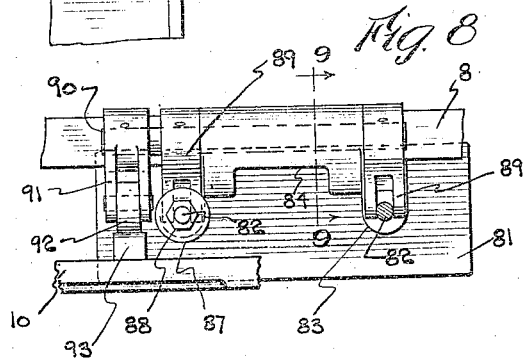
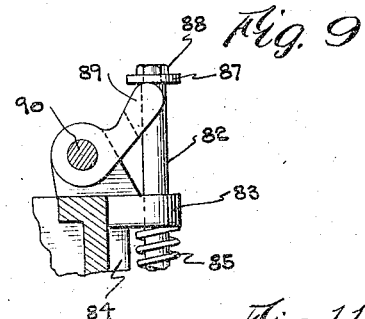
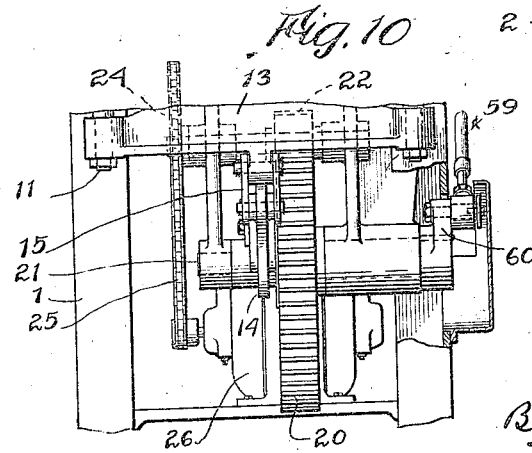
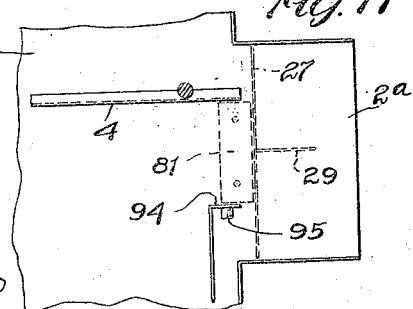
Inventors:
T. L. Valerius
Olaf Larsen Nov. 1, 1927.
T. L. VALERIUS ET AL
1,647,384
ICE CREAM CUTTING MACHINE
Filed Aug. 11, 1921     5 Sheets-Sheet 4
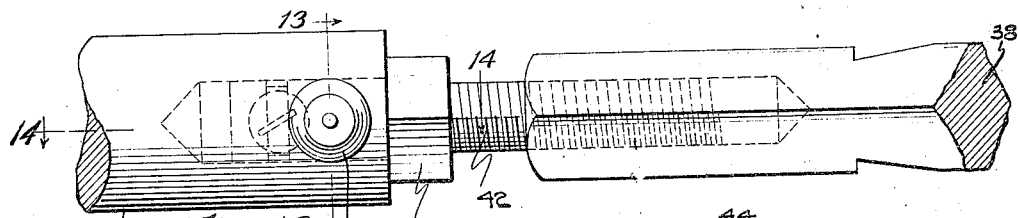
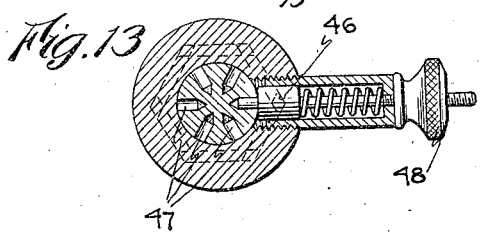
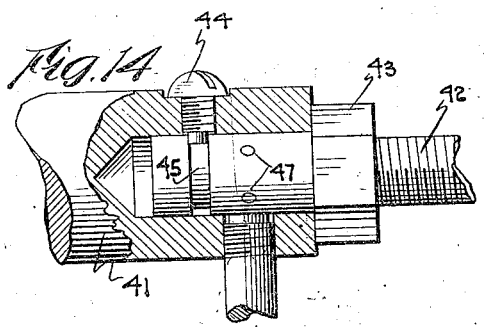
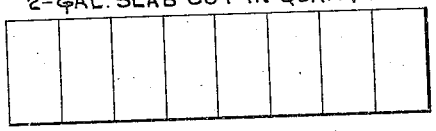
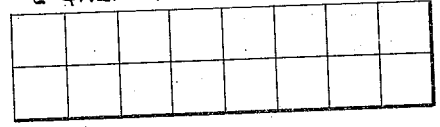
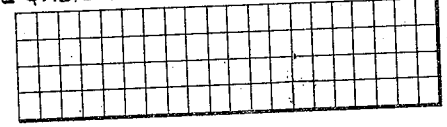
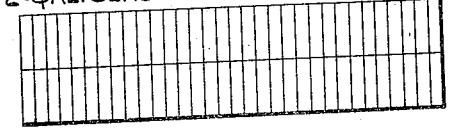
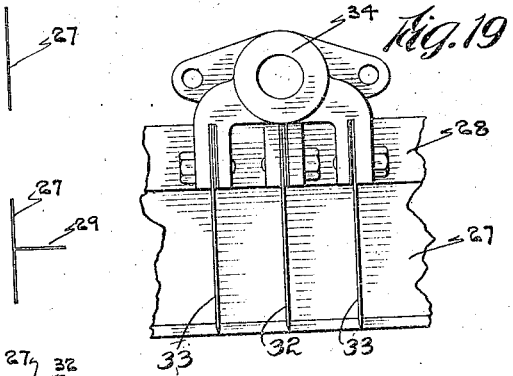
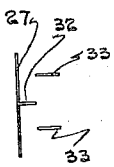
Inventors:
T. L. Valerius
Olaf Larsen
By Miller Chidsell Packer
Att'ys Nov. 1, 1927.  1,647,384
T. L. VALERIUS ET AL.
ICE CREAM CUTTING MACHINE
Filed Aug. 11, 1921   5 Sheets-Sheet 5
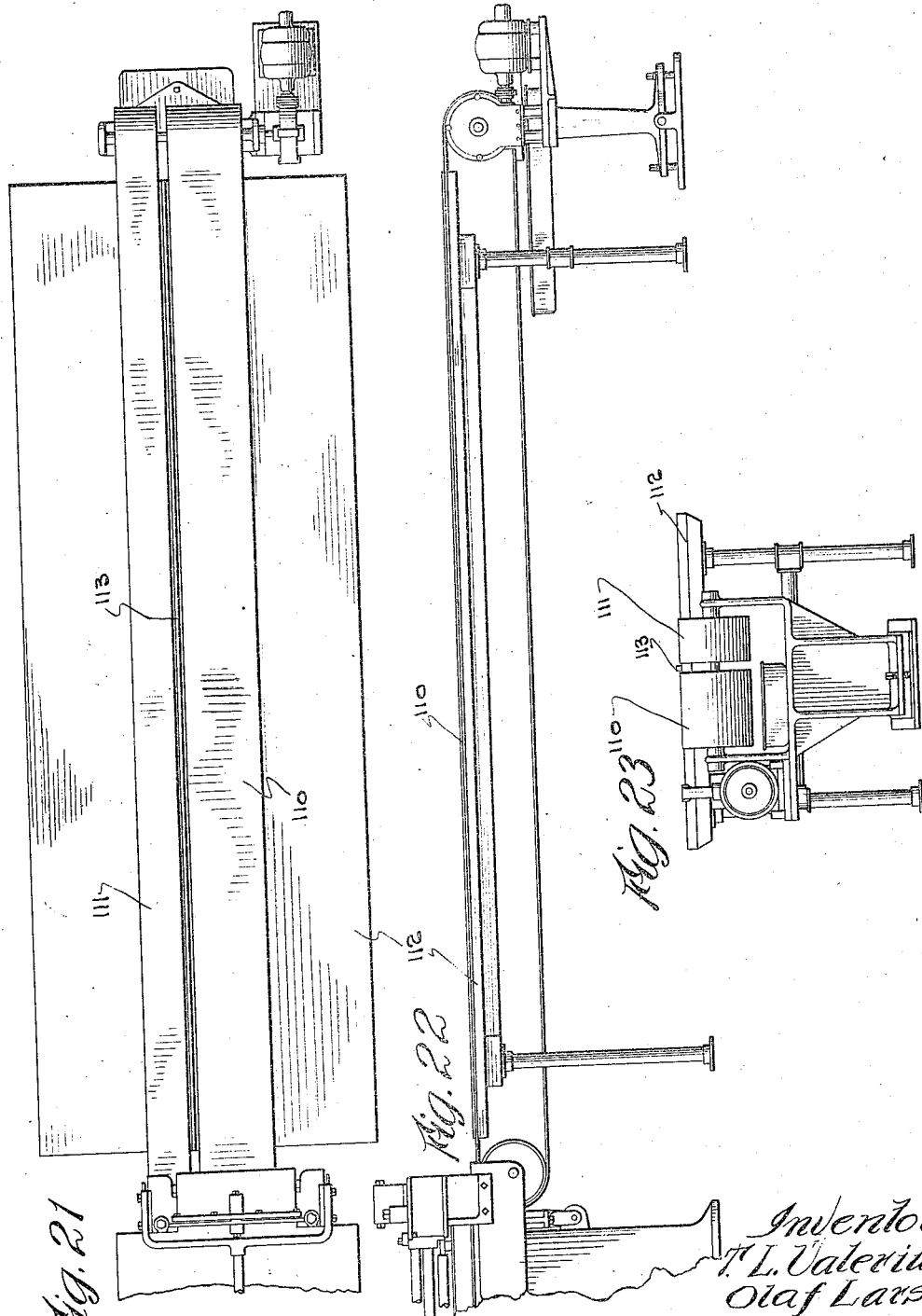

Patented Nov. 1, 1927.

1,647,384

UNITED STATES PATENT OFFICE.

THEODORE L. VALERIUS AND OLAF LARSEN, OF FORT ATKINSON, WISCONSIN, ASSIGNORS TO THE CREAMERY PACKAGE MFG. COMPANY, OF CHICAGO, ILLINOIS, A CORPORATION OF ILLINOIS.

ICE-CREAM-CUTTING MACHINE.

Application filed August 11, 1921. Serial No. 491,387.

The object of this invention generally stated is to provide an automatic machine for cutting ice cream into bricks, slices or cubes. Subsidiary objects are to provide simple means for adjusting the machine to cut portions of the desired size; to obtain uniformity in size and shape of product; and to provide for convenient and rapid operation of the machine.

Ice cream which is intended to be sold in the form of bricks, slices or cubes is commonly frozen in elongated pans or molds of such dimensions that the contents of the mold may be cut transversely into quart bricks. It is important that an ice cream brick cutter shall be capable of operating upon slabs of ice cream frozen in standard molds, so as not to require changes in practices which have become standard in ice-cream manufacturing plants.

So-called brick ice cream is made in great variety, many sorts containing a layer of water ice. The slab of material to be cut into bricks, slices or cubes is frozen hard before being subjected to the cutting operation, and therefore is comparatively incompressible and brittle. It is essential that the cutting apparatus shall not subject the material to any considerable degree of compression, since such action would cause more or less crumbling of the material, as well as mechanical difficulties in the operation of the machine. The machine herein disclosed is adapted to meet the various requirements for effective and economical operation.

In the accompanying drawings Figure 1 is a side elevation of one form of machine embodying the features of our invention. Fig. 1$^a$ is a section on line $a$—$a$ of Fig. 1. Fig. 2 is a top plan view of the machine. Figs. 3 and 4 illustrate the forwarder. Fig. 5 is a view of the discharge end of the machine. Fig. 6 is a section on line 6—6 of Fig. 2. Fig. 7 is a front view of the stripper. Fig. 8 is a plan view of the stripper. Fig. 9 is a section on line 9—9 of Fig. 8. Fig. 10 is a view of the driving mechanism. Fig. 11 is a plan view showing the relative location of the knives, the guides and the stripper. Fig. 12 is a fragmental view of the feed ratchet bar and its adjusting means. Fig. 13 is a section on line 13—13 of Fig. 12. Fig. 14 is a section on line 14 of Fig. 12. Figs. 15, 16, 17 and 18 are diagrams illustrating the manner of cutting slabs into quart bricks, pint bricks, cubes and slices. Figs. 19 and 20 represent the knives used in cutting cubes. Fig. 21 is a plan view, Fig. 22 a side elevation of, and Fig. 23 an end view of a wrapping and packaging table different from the one shown in Fig. 2.

Upon the main frame 1 of the machine is secured a top plate or table 2. 3 is the forwarder for pushing the slab of ice cream step by step into position beneath a vertically reciprocating knife or set of knives. 4 is a guide or guard plate against which the operator places the slab, said plate serving to locate the slab in proper relation to the knives. Said guide plate is fixed to lugs 5 which in turn are attached to supports 6 and 7 (Fig. 2). The support 6 is adjustably clamped upon a frame member 8 which is rigidly secured to the main frame. The support 7 is adjustably connected to a bracket 9 rising from the main frame. By reference to Fig. 1 it will be seen that the guide plate 4 is laterally adjustable toward and away from the line of travel of the slab.

The knife or knives are carried by an upper cross-head or knife holder 10 (Figs. 2 and 5) the ends of which are secured to two rods 11 which are vertically reciprocable in guide openings 12 (Fig. 5) in the machine frame. The lower ends of the rods 11 are attached to a cross-head 13.

While the means for reciprocating the cross-head 13 may be of any suitable character there is herein shown a lever 14 Fig. 1) connected to the cross-head by links 15 and pivoted to the machine frame at 16. In a slot 17 in the lever 14 is slidably mounted a block 18 which is engaged by a crank pin 19 carried by a spur gear wheel 20. The latter is fixed upon one end of a shaft 21. Meshing with the gear wheel 20 is a pinion 22 fixed upon a shaft 23 that carries a sprocket wheel 24. A drive chain 25 communicates power to the wheel 24 from a sprocket wheel on the shaft of a motor 26.

When quart bricks are to be cut, we employ a knife 27 (Fig 5) adapted to sever the slab transversely, as indicated in the diagram, Fig. 15. The knife 27 is clamped to the upper cross-head 10 by means including a plate 28.

When the slab is to be cut into pint bricks, there is employed in addition to the knife 27 a knife 29 (Figs. 6 and 16) arranged to sever the slab along a line extending centrally and longitudinally of the slab. The knife 29 is secured to the cross-head 10 by means of a holder 30 detachably connected to the cross-head by a screw-stud 31.

When the slab is to be cut into cubes, say ten cubes per quart, we use, in addition to the knife 27, three knives 32 and 33 (Figs. 17, 19 and 20) arranged to cut on three lines extending longitudinally of the slab. The knife 32, which cuts on the longitudinal center line of the slab, is located so as to cut in advance of the two knives 33. This arrangement is adopted because the cream, being frozen hard, is split by the knives and the severed portions are displaced to an extent corresponding to the thickness of the knives. If the knives 32 and 33 were abreast of each other and operated simultaneously, the ice cream would be tightly jammed between said knives and more or less crumbled. With the arrangement herein disclosed, the portions severed by the knives 27 and 32 are free to move on the table as the said knives split off said portions from the slab. When said portions are further subdivided into cubes by the knives 33 the cubes are free to move on the table. Thus it will be seen that the severed portions are not deformed or crumbled or jammed between the knives. The knives 32 and 33 are detachably secured to the cross-head 10 by means of a holder 34 and a screw stud 31.

The same arrangement of knives which is used for pints serves for all sizes of slices (see Fig. 18).

It may be here observed that the frame member 8 is arched to provide space beneath it for the passage of the slab. The top plate 2 has a portion 2ª (Figs. 2 and 11) which extends forwardly beneath the knife.

Referring now to the forwarder 3 and its actuating mechanism. As indicated by the diagrams in Figs. 15 and 16, the extent of movement imparted to the slab during each step of its advance is the same for pints as for quarts. When cutting cubes and slices, the length of each step must correspond to the size of the portions to be cut. Means is therefore provided for intermittently advancing the forwarder 3 through variable distances.

The forwarder 3 has an upwardly extending body 35 (Figs. 3 and 5) which is slidably mounted on a guide rod 36. The ends of the latter are fixed to the frame member 8 and a bracket 37. The means for advancing the forwarder comprises a reciprocating ratchet bar 38 and the means for holding the forwarder against retrograde movement while the ratchet bar 38 is moving rearwardly comprises a stationary ratchet bar 39. As shown in Fig. 3, the body 35 is slotted to accommodate the bars 38 and 39. In order to provide for varying movement of the forwarder, a plurality of sets of ratchet teeth are formed in the sides of said bars, and the bars are rotatably mounted so that they may be turned to bring the desired set of teeth into position for engagement by the pawls hereinafter mentioned. As indicated in Fig. 13, the ratchet bars may be of polygonal form, each face being provided with a different series of ratchet teeth. In practice the bars 38 and 39 are provided by the builder of the machine with ratchet teeth spaced to provide the feed movements necessary to produce the various sizes of bricks, slices or other portions desired by the particular ice cream manufacturer for whom the machine is intended.

The anti-return bar 39 is supported at its ends in the frame member 8 and the bracket 37. The forward end of the moving ratchet bar 38 is rotatably and slidably supported upon a guide pin 40 fixed in the frame member 8, said pin fitting within an axial opening in the bar. The rear end of the ratchet bar 38 is attached to a slide 41. In the present construction the ratchet bar 38 has an axial screw-threaded opening to receive the threaded portion of an adjusting stud 42 (Fig. 12). On the stud 42 is formed a hexagonal collar or flange 43. The stud 42 fits rotatably within an axial opening in the slide 41 and is confined therein, by a screw 44 the inner end of which extends into a peripheral groove 45 in the stud. Any suitable means may be used to hold the ratchet bar 38 in adjusted position, as, for example, a spring plunger 46 adapted to enter any one of a plurality of holes 47 in the stud 42. The outer end of the plunger 46 carries a knurled adjusting nut 48 by means of which the plunger may be manually operated to release the stud to rotation. The anti-return ratchet bar 39 may be locked in adjusted position by any suitable means, as, for example, a set screw 39ª having an angular handle for turning it.

The slide 41 is mounted in the brackets 37 and 49, (Figs. 1 and 2). In the slide is formed a slot 50 extending perpendicularly to the direction of movement of the slide. Through this slot extends a crank pin 51 carried by a lever 52. Said lever is longitudinally slotted to receive a rib or tongue 53 (Fig. 1ª) formed on a sleeve 54 fixed to a shaft 55. A stud 56 and washer 57 serve to clamp the lever 52 to the sleeve 54. To the shaft 55 is fixed a lever 58 which is connected by a link 59 of adjustable length to a crank arm 60 (Fig. 10) on the shaft 21.

Referring now to Figs. 3 and 4: 61 is a feed dog and 62 a holding dog pivoted at 63 and 64, respectively, to the body 35 of the forwarder. Said dogs are held in engagement with the forwarding ratchet bar 38 and the anti-return ratchet bar 39, respectively, by a tension spring 65 which is connected at its ends to studs 66 fixed to the dogs.

Means is provided for simultaneously throwing both dogs 61 and 62 in and out of engagement with the ratchet bars 38 and 39. This means consists, in the present instance, of a trip-off lever 67 pivoted between its ends at 68 to the body 35 of the forwarder. Each end of the lever 67 is provided with two notches 69 and 70 adapted to receive the end of one of the studs 6. The notch 69 is sufficiently deep to allow the dog to engage its ratchet bar; the notch 70 is farther from the center 68 and is adapted to hold the dog out of engagement with its bar. In order that the fed movement of the forwarder may be suspended without returning the forwarder to starting position, there is pivoted on the lever 67 at 71 a stop lever 72 having a notch 73 adapted to receive the stud 66 of the feed dog 61 and hold said dog away from the forwarding ratchet bar 38.

Any suitable means may be employed to return the forwarder 3 to initial position after a slab has been cut. The means herein shown comprises a weight 74 (Fig. 1) connected to the forwarder through the medium of a chain 75 extending around an idler sprocket 76 on the machine frame and a sprocket 77 on the weight. One end of the chain is fastened to the forwarder, the other end being secured at 78. The weight 74 has a sliding fit in the air chamber 79. In the lower end of the air chamber is an air vent 80. When the dogs 61 and 62 are disengaged from the ratchet bars, the weight 74 pulls the forwarder to its starting position, the descent of the weight being cushioned or checked by the air contained in the chamber 79 below the weight.

In Figs. 6 and 9 is shown a stripper mechanism for insuring that the slab shall not adhere to or be displaced by the knife or knives when the latter are moved upwardly. Said mechanism comprises a plate 81 attached to two parallel studs 82 which are vertically slidable in guide lugs 83 on a bracket 84 fixed to the frame member 8. Coiled expansive springs 85 surround the studs 82 and bear against the upper lugs 83 and collars 86 fixed on the studs. On the upper ends of the studs 82 are washers 87 and nuts 88. Forked levers 89 are arranged to engage the lower sides of the washers 87 to lift the plate 81. The levers 89 are fixed upon a shaft 90 journaled in the bracket 84. On one end of the shaft 90 is fastened a lever 91 carrying an antifriction roller 92 arranged to bear against a slide bar 93 fixed to the upper cross-head 10. The slide bar and the roller are so arranged that before the knife reaches the slab the slide bar has descended far enough to allow the roller to descend, thus permitting the springs 85 to press the plate 81 against the slab directly behind the line along which the slab is to be cut. The roller 92 and the slide bar 93 restrain the action of the springs 85. When the knife rises the plate 81 remains pressed against the slab until the knife is entirely clear of the slab, thus preventing the slab from being moved out of proper position as the knife ascends.

Means is provided for coaction with the guide 4 to hold the forward portion of the slab in proper relation to the knives. In the present embodiment the means referred to consists of a side guide plate 94 (Figs. 5 and 11) attached to a stud 95 which is yieldingly mounted in a bracket 96. Said bracket is adjustably secured to the frame member 8. In advancing to the knives the slab passes between the guides 4 and 94, as shown in Fig. 11. It frequently happens that brick molds become distorted through rough handling. A slab of ice cream frozen in such a mold is of course somewhat irregular in form. The guide 94 is yieldingly mounted so that it may yield to allow the passage of a slab having a portion of excessive width.

The means for removing the severed portions from the machine may be of any suitable character. Figs. 1 and 2 show one arrangement of conveyers, while Figs. 21, 22, and 23 illustrate another form. Referring first to Figs. 1 and 2: 105 is a conveyer belt running over pulleys 106 and 107 (Fig. 2), the pulley 106 being located in position to support the upper run of the belt adjacent to the discharge end of the portion 2ª of the top plate 2. The upper run of the belt 105 travels upon a table (not shown) along both sides of which may be seated employees who take the bricks or other portions from the belt, wrap said portions and place the wrapped portions upon two other belts 108 and 109. The upper runs of the last mentioned belts extend over a table (not shown) along the sides of which are stationed employees who take the wrapped portions and place them in cartons.

In Figs. 21, 22 and 23 are shown two conveyer belts 110 and 111 arranged side by side and traveling over a table 112. Between the belts is a low partition 113. The belt 110 is alined with the discharge from the cutting machine and receives the bricks. After the bricks have been wrapped, they are placed upon the belt 111. From this belt they are taken and placed in cartons.

If desired, the conveyer belts may be so arranged that the bricks, after being wrapped and cartoned, can be delivered directly into the hardening room.

Assuming that quart bricks are to be cut, the operation is as follows: The ratchet bars 38 and 39 are turned into the position shown in Fig. 1 and the lever 52 is placed in the position illustrated in said figure. The upper cross-head 10 carries a knife 27 only. The forwarder 3 being in initial position, a slab of ice cream is placed upon the top plate 2 in contact with the guide 4. The operator then swings the handle of the lever 67 to the left into the position shown in Fig. 4, whereby the dogs 61 and 62 are placed in engagement with the ratchet bars 38 and 39. In the reciprocation of the bar 38 the forwarder 3 is advanced step by step, thus feeding the slab to the cutting mechanism, the slab being advanced while the knife is up, and the forwarder being stationary while the knife is passing into and out of the slab. With each forward movement of the ratchet bar 38, the forwarder 3 is advanced far enough to place the dog 62 sufficiently ahead of the appropriate tooth of the bar 39 to ensure that the dog shall catch said tooth when the ratchet bar 38 is retracted, the weight 74 acting to place the dog against said tooth.

The series of ratchet teeth of the bar 38 is of such length that the advancing movement of the forwarder ceases when the slab has been cut up.

If at any time the operator desires to suspend the advance of the forwarder 3, he raises the lever 72, thereby disengaging the feed dog 61 from the ratchet bar 38 and leaving the holding dog 62 in engagement with the ratchet bar 39.

When the slab has been cut up, the operator swings the handle of the lever 67 to the right, whereupon the weight 74 returns the forwarder 3 to starting position.

When pint bricks are to be cut, no change is required except the addition of the knife 29.

When slices or cubes are to be cut, knives are used as shown in Figs. 17 and 18; the ratchet bars 38 and 39 are turned to place the required series of ratchet teeth in position for engagement by the dogs 61 and 62; and the lever 52 is adjusted with reference to the shaft 55 so that the length of the oscillation of said lever shall correspond to the length of each advance movement or step of the forwarder.

It will be understood that various changes may be made without departing from the spirit of the invention as set forth in the appended claims.

We claim as our invention:

1. An ice cream cutting machine comprising, in combination, a reciprocatory severer, means for feeding a slab of ice cream step by step into the path of movement of the severer, and a reciprocatory plate supported independently of said severer and arranged to press down upon the slab adjacent to the severer while the latter is rising, said plate being operable to be lifted prior to each advance movement of the slab.

2. An ice cream cutting machine comprising, in combination, a reciprocatory severer, means for feeding a slab of ice cream step by step into the path of movement of said severer, a reciprocatory plate resiliently actuated to press down upon the slab adjacent the severer, a slidable support carrying said plate, and lever means having one arm in operative engagement with said support and having another arm operatively engageable by said severer when in retracted position to lift said plate prior to each advance movement of the slab.

3. An ice cream cutting machine having, in combination, a movably mounted forwarder, an anti-return ratchet bar and a reciprocatory ratchet bar extending parallel with each other, two dogs on the forwarder arranged to engage said bars respectively, means for independently disengaging the dog having engagement with said reciprocatory bar, and means for simultaneously disengaging both dogs from said ratchet bars.

4. An ice cream cutting machine having, in combination, a movably mounted forwarder, an anti-return ratchet bar, a reciprocatory ratchet bar, two dogs on said forwarder arranged to engage said bars respectively, a lever pivoted on said forwarder adapted to operatively engage both of said dogs and simultaneously disengage them from said bars, and a second lever adapted to operatively engage one only of said dogs and disengage it from its respective bar.

5. An ice cream cutting machine having, in combination, a movably mounted forwarder, a ratchet bar supported for rotation on its axis without longitudinal movement, a parallel ratchet bar supported for both rotary and longitudinal movement, and a pair of dogs on said forwarder arranged to engage said bars respectively, each of said bars having a plurality of longitudinally arranged series of ratchet teeth formed on its several sides, the spacing of the teeth of each series being different from that of each other series on the same bar, like series of teeth on the two bars being selectively presentable by the rotation of said bars for engagement therewith by the said dogs respectively.

6. An ice cream cutting machine having, in combination, a movably mounted forwarder, a stationary anti-return ratchet bar, a longitudinally reciprocatory ratchet bar extending parallel to said other bar, a pair of dogs on said forwarder arranged to engage said bars respectively, said reciprocatory bar having a plurality of longitudinally arranged series of ratchet teeth formed on its several sides, the spacing of the teeth of each series being different from that of each other series, said reciprocatory bar being rotatable on its axis to selectively present any series of teeth for engagement by its respective one of said dogs, and means for imparting reciprocatory motion to said reciprocatory bar, said means being adjustable to limit the movement of said bar selectively to distances coincident with the spacing of any of said series of teeth.

7. An ice cream cutting machine having, in combination, a reciprocatory severer, an element for pushing a slab of ice cream into the path of the severer, a ratchet bar, a member on the pushing element to engage the ratchet bar, a member connected to the ratchet bar and having a slot extending at an angle to the direction of movement of the ratchet bar, a rock shaft, and an arm adjustable radially of said shaft to vary the movement of the arm, said arm having a crank pin lying within said slot.

8. An ice cream cutting machine having, in combination, means for longitudinally advancing a slab of ice cream, a reciprocatory knife arranged to sever the slab transversely of the latter, a knife fixed to the first-mentioned knife for cutting in half the portion cut off by the first-mentioned knife, and two knives fixed to the other knives in position to cut in half each of the portions cut by the second-mentioned knife.

9. An ice cream cutting machine having, in combination, means for longitudinally advancing a slab of ice cream, a reciprocatory knife arranged to sever the slab transversely of the latter, a knife for cutting in half the portion cut off by the first knife, said knives acting simultaneously upon the same portion, and two knives arranged to cut in half each of the portions cut by the second knife, said two knives acting subsequently to the first and second knives.

10. In an ice cream brick cutter having cutting mechanism, a frame; a table thereon; means for guiding a slab on the table; a pusher arm adapted to propel the slab; a ratchet pawl connected with the pusher arm; a slidably and rotatably mounted feed arm provided with longitudinal series of spaced notches having shoulders adapted to engage the ratchet pawl, the notches in each series being differently spaced from those in the other series; means for rotating the feed arm to bring a selected series of notches into range with the ratchet pawl; means for imparting reciprocatory motion to the feed arm, and means for varying the throw of the feed arm.

In testimony whereof we have hereunto set our hands.

THEODORE L. VALERIUS.
OLAF LARSEN.